April 18, 1967 W. A. BROAD 3,315,055

TEMPERATURE-RESPONSIVE EXPANSIBLE-FLUID SWITCH

Filed Nov. 16, 1964

Inventor
Walter Alfred Broad
By Cushman, Darby & Cushman
Attorneys 3,315,055
TEMPERATURE-RESPONSIVE EXPANSIBLE-
FLUID SWITCH
Walter Alfred Broad, Glamorgan, Wales, assignor to H. J.
Elliott Limited, Glamorgan, Wales, a British company
Filed Nov. 16, 1964, Ser. No. 411,437
Claims priority, application Great Britain, Nov. 18, 1963,
45,493/63
3 Claims. (Cl. 200—141)

This invention relates to a temperature-responsive instrument.

Figure 1:
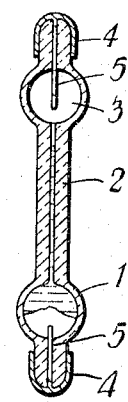
Figure 2:
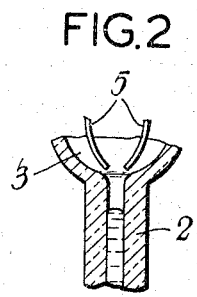
Figure 3:
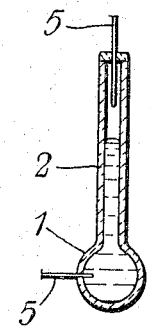

FIGURES 1 to 3 of the accompanying drawings illustrate three prior proposals for temperature-responsive instruments, each of which was designed to effect an electrically conductive connection between two electrical conductors upon the temperature to which the instrument is subjected rising to a predetermined value.

In the instrument according to FIGURE 1, a reservoir consisting of a bulb 1 and a tube 2 contains mercury. The reservoir has its upper end opening into a chamber 3, right at the bottom of the chamber. Two electrical conductors, each consisting of a cap 4 and a pin 5, are provided at opposite ends of the instrument, one having its pin projecting into the mercury in the bulb 1 and the other having its pin projecting into the chamber 3 and terminating just above the top of the bore in the tube 2. The two caps 4 may be connected in an electrical circuit which includes a battery and a bell which will ring when the circuit is completed by the mercury expanding into the chamber 3 and contacting the upper pin 5, which it does only when the temperature to which the instrument is subjected rises to a predetermined value. This value cannot be changed, except by most inconvenient methods, for example by somehow opening the instrument, changing the quantity of mercury in it and sealing it again.

In the instrument of which a part is shown in FIGURE 2, two electrically conductive wires 5 in a chamber 3 have lower ends just above the top of the bore in a reservoir tube 2 which contains mercury and which opens into the chamber 3 right at the bottom of the chamber. Upon the temperature to which the instrument is subjected rising to a predetermined value, which again cannot conveniently be altered, mercury which has expanded and risen into the chamber 3 makes an electrically conductive connection between the two wires 5 and this can bring about the operation of an alarm as described before.

In the instrument shown in FIGURE 3, one wire 5 contacts mercury in a bulb 1 from which projects a tube 2 into the upper, closed, end of which is inserted another wire 5 which can be raised or lowered to alter the value of the temperature to which the instrument must be subjected in order for the rising column of mercury to contact the upper wire 5 and make an electrically conductive connection to the lower wire 5. In order to set to a desired value the temperature at which this conductive connection is made, the lower end of the instrument may be immersed in a bath of liquid the temperature of which is at the desired value and the upper wire 5 may be raised or lowered until its lower end is just touching the upper surface of the mercury. Thus, setting of the instrument requires careful attention on the part of the operator. Another disadvantage of this instrument is that where the wire 5 emerges from the tube 2 air can enter and cause oxidation of the mercury. This disadvantage can be overcome by arranging for all the wire 5 to be within the tube 2, which is then completely closed, and effecting movement of the wire 5 with the aid of a magnet outside the tube. This is a rather expensive arrangement.

It is an object of the present invention to provide a temperature-responsive instrument in which an electrically conductive connection is made between two conductors, by means of an electrically conductive liquid, when the temperature to which the instrument is subjected rises to a critical value and in which the magnitude of the critical value can be altered without either of the conductors being moved.

According to the invention, there is provided a temperature-responsive instrument comprising a tubular reservoir, a quantity of electrically conductive liquid in the reservoir, portions of the reservoir defining an opening at the top thereof, a chamber through the bottom of which the reservoir projects so that said opening is above the bottom of the space within the chamber so that upon the instrument being subjected to a sufficiently high temperature some of the liquid can emerge from the reservoir through said opening and upon the instrument being subjected to a substantially higher temperature the liquid which has emerged as aforesaid can fall in said space, a first electrical conductor in the chamber, means supporting the first electrical conductor and causing its lower extremity to be maintained just above said opening at the top of the reservoir so as to be contacted by the liquid as it emerges through said opening upon a slow increase in the temperature to which the instrument is subjected and to be out of contact with the liquid as it falls in said space, and a second electrical conductor in a position to be connected by the liquid to the first electrical conductor upon the latter being contacted by the liquid as aforesaid.

It is already known to make a temperature-responsive instrument somewhat similar to the instrument according to the invention, as defined above, but with the lower extremity of the "first electrical conductor" so far above the opening at the top of the tubular reservoir that the electrically conductive liquid could rise out of the reservoir, make contact with the "first electrical conductor" and fall into the space in the "chamber," out of contact with the "first electrical conductor," only if the instrument were subjected to a very rapid increase in temperature, which would result in a jet of the liquid shooting out of the top of the reservoir, contacting the "first electrical conductor" and then falling. In contrast to this, in an instrument according to the present invention, the lower extremity of the "first electrical conductor" is maintained so close to the opening at the top of the tubular reservoir that upon a slow increase in the temperature to which the instrument is subjected liquid emerges from the tubular reservoir and forms a coherent globule which is maintained by surface tension on the top of the tubular reservoir and the liquid in this globule makes contact with, and to some extent climbs up, the "first electrical conductor." The liquid is allowed to fall from the upper end of the tubular reservoir as aforesaid only when the operating temperature of the instrument is being re-set and, unless the liquid is shaken off the top of the reservoir by the person who is re-setting the operating temperature of the instrument, the liquid cannot fall until the temperature to which the instrument is subjected has risen to a value substantially higher than that which resulted in the liquid making contact with the "first electrical conductor."

Figure 4:

An example in accordance with the invention is described below with reference to FIGURE 4 of the accompanying drawing, which shows a sectional view of part of a temperature-responsive instrument.

The instrument illustrated includes a glass reservoir consisting of a vertical tube 11 and a bulb (not shown) at the lower end of the tube. The tube is open at its top and it has its upper end portion 12 reduced in external diameter or width and inserted in the lower end of a chamber or space formed in a glass tube 13, which has substantially the same external diameter or width as the part of the tube 11 below the end portion 12 of the tube 11 and a much greater internal diameter than the tube 11. The upper end 14 of the tube 13 is closed and the lower end is so joined to the tube 11 as to form a seal. The bore of the tube 11 has a diameter of 0.5 mm. The bulb and the bore of the tube contain mercury 15 and this is contacted by an electrical conductor 16 made of platinum wire which projects into the bore of the tube 11. A platinum wire 17 having a glass sheath 18 projects through the wall of the tube 13 and into the chamber, where its end portion 19 extends downwardly and its tip is spaced about 1 mm. from the end of the tube 11, and is directly above the bore in the tube 11. It is to be noted that the upper end of the tube 11 is above the bottom of the chamber or space in the glass tube 13, that is to say the reservoir opens into the chamber or space above its bottom.

When the instrument is subjected to a slow temperature rise to a sufficiently high temperature, some of the mercury, which rises in the tube 11, emerges from the end of that tube and forms on the top of the tube a globule which makes contact with the platinum wire 17, thereby making an electrically conductive connection between the conductor 16 and the wire 17. Therefore the conductor 16 and the wire 17 can be connected in a circuit which also includes a source of current and an indicating or control device, which is operated by current flowing through it in the circuit when the instrument is subjected to a sufficiently high temperature. The indicating or control device may function by interrupting the flow of curent in a second circuit.

Any further increase in the temperature to which the instrument is subjected would cause more mercury to emerge from the top of the tube 11 and if this increase in temperature were substantial mercury which has contacted the wire 17 would fall in the chamber or space and would no longer make contact with the wire 17. This does not correspond to the normal manner of use of the instrument but is of significance as regards the pre-setting of the temperature at which the indicating or control device operates, as explained below.

To pre-set the temperature at which the indicating or control device is operated, the temperature-responsive instrument is held in an upright position and the bulb of the instrument and about an inch of the tube 11 adjacent the bulb are inserted in a liquid bath which is maintained at the temperature at which the indicating or control device is intended to operate. Mercury rises up the tube 11 and a stream of mercury droplets emerge from the top of the tube 11, the droplets falling into the annular space 20 between the tubes 11 and 13, where the mercury is referenced 21 in the drawing. When the droplets cease to emerge from the top of the tube 11, the top of the instrument is gently tapped, this causing surplus mercury above the top of the tube 11 to fall into the space 20. The instrument is then slowly lowered further into the liquid (but not to such an extent that the conductor 16 enters the liquid) until a small quantity of mercury finaly protrudes above the top of the tube 11 and makes contact with the wire 17. This small quantity is allowed to remain, so that it re-enters the tube 11 when the instrument is removed from the bath.

If the instrument is to be pre-set again so as to cause operation of the indicating or control device at a higher temperature, the process described above is repeated, using a bath at the appropriate higher temperature. If, however, the instrument is to be pre-set again but this time for a lower operating temperature, the instrument is held vertical but upside down and it is tapped gently so that the mercury in the space 20 falls to the end 14 of the tube 13. This quantity of mercury and the dimensions of the tube 13 are so related to one another that, in contrast to what is shown in the drawing, which is purely diagrammatic and not to scale, the end of the tube 11 is beneath the level of the mercury in the tube 13. The bulb is heated so that mercury in the tube 11 travels to the end of that tube and joins with the mercury in the tube 13, whereupon the bulb is slowly cooled, whilst the instrument is still inverted, to a temperature below that to which it is to be pre-set. This causes mercury that was previously in the tube 13 to enter the tube 11. Finally, the instrument is turned upright again and its operating temperature is pre-set in the manner described initially.

The tube 11 need not all be vertical. It could be L-shaped, with the portion that opens into the chamber or space within the tube 13 being vertical or nearly vertical. The wire 17 could be straight and co-axial with the tube 13, entering the latter at the top.

If desired, the wire 16 could be in the tube 13 in addition to the wire 17, the tips of the two wires being arranged directly above the top of the bore in the tube 11 and both of them being arranged to be contacted by the globule of mercury which forms on the top of the tube as described previously.

I claim:

1. A temperature-responsive instrument comprising a tubular reservoir, a quantity of electrically conductive liquid in the reservoir, portions of the reservoir defining an opening at the top thereof, a chamber through the bottom of which the reservoir projects so that said opening is above the bottom of the space within the chamber so that upon the instrument being subjected to a sufficiently high temperature some of the liquid can emerge from the reservoir through said opening and upon the instrument being subjected to a substantially higher temperature the liquid which has emerged as aforesaid can fall in said space, a first electrical conductor in the chamber, means supporting the first electrical conductor and causing its lower extremity to be maintained just above said opening at the top of the reservoir so as to be contacted by the liquid as it emerges through said opening upon a slow increase in the temperature to which the instrument is subjected and to be out of contact with the liquid as it falls in said space, and a second electrical conductor supported in the reservoir in a position to be connected by the liquid to the first electrical conductor upon the latter being contacted by the liquid as aforesaid.

2. A temperature-responsive instrument comprising a tubular reservoir, an upper end portion of the reservoir having a reduced external width as compared with a part of the reservoir which is below said upper end portion, portions of the reservoir defining an opening at the top thereof, a tubular member which has a closed upper end and has a lower end into which projects said upper end portion of the reservoir to a place above the bottom of the space within said tubular member, said tubular member having an external width substantially the same as that of said part of the reservoir, a seal between the lower end of said tubular member and the tubular reservoir, a quantity of electrically conductive liquid in the tubular reservoir which upon the instrument being subjected to a sufficiently high temperature can emerge from the reservoir through said opening whereas upon the instrument being subjected to a substantially higher temperature some of the liquid which has emerged as aforesaid can fall in said space, a first electrical conductor in said tubular member, means supporting the first electrical conductor and causing its lower extremity to be maintained just above said opening at the top of the reservoir so as to be contacted by the liquid as it emerges through said opening upon a slow increase in the temperature to which the instrument is subjected and to be out of contact with the liquid as it falls in said space, and a second electrical conductor supported in said reservoir in a position to be connected by the liquid to the first electrical conductor upon the latter being contacted by the liquid as aforesaid.

3. A temperature-responsive instrument comprising a tubular reservoir, a quantity of electrically conductive liquid in the reservoir, portions of the reservoir defining an opening at the top thereof, a chamber through the bottom of which the reservoir projects so that said opening is above the bottom of the space within the chamber so that upon the instrument being subjected to a sufficiently high temperature some of the liquid can emerge from the reservoir through said opening and upon the instrument being subjected to a substantially higher temperature the liquid which has emerged as aforesaid can fall in said space, a first electrical conductor in the chamber, means supporting the first electrical conductor and causing its lower extremity to be maintained just above said opening at the top of the reservoir so as to be contacted by the liquid as it emerges through said opening upon a slow increase in the temperature to which the instrument is subjected and to be out of contact with the liquid as it falls in said space, and a second electrical conductor supported in a position to be connected by the liquid to the first electrical conductor upon the latter being contacted by the liquid as aforesaid.

References Cited by the Examiner

UNITED STATES PATENTS 2,611,057   9/1952   Slonneger _____ 200—81.6

FOREIGN PATENTS 276,573   9/1927   Great Britain.

BERNARD A. GILHEANY, *Primary Examiner.*

H. B. GILSON, *Assistant Examiner.*